United States Patent [19]
Collette

[11] Patent Number: 5,570,146
[45] Date of Patent: Oct. 29, 1996

[54] DIGITAL IMAGE RECORDING DEVICE

[76] Inventor: Michael L. Collette, 1720 Milton St., Redwood City, Calif. 94061

[21] Appl. No.: 251,793

[22] Filed: May 31, 1994

[51] Int. Cl.$^6$ ............................................. G03B 29/00
[52] U.S. Cl. ............................................. 396/429; 348/64
[58] Field of Search ............................ 348/64; 354/75, 354/76

[56] References Cited

U.S. PATENT DOCUMENTS

| | | | |
|---|---|---|---|
| 4,303,322 | 12/1981 | Someya | 354/219 |
| 4,725,889 | 2/1988 | Yaniv et al. | 358/482 |
| 4,788,594 | 11/1988 | Ovshinsky et al. | 348/64 |
| 4,831,450 | 5/1989 | Sato et al. | 354/75 |
| 4,853,785 | 8/1989 | Ovshinsky et al. | 348/302 |
| 4,949,117 | 8/1990 | Van Heyningen et al. | 354/412 |
| 4,953,029 | 8/1990 | Morimoto et al. | 354/75 |
| 5,034,822 | 7/1991 | Stevens | 354/75 |
| 5,150,215 | 9/1992 | Shi | 354/76 |

*Primary Examiner*—David M. Gray
*Attorney, Agent, or Firm*—Palmatier, Sjoquist, Helget & Voigt, P.A.

[57] ABSTRACT

The digital image recording device includes a tri-linear array of photosensing elements which include a plurality of photosensor pixels. The tri-linear array of photosensing elements is mounted upon a frame for linear movement within a universal housing. The housing is adapted for insertion into the cartridge film slot of a standard view camera. The movement of the array of photosensing elements across an image plane within the standard view camera sequentially senses an image to be recorded. Each row of the tri-linear array of photosensing elements includes a separate color filter stripe which enables the color recording of an image during one pass of the scanner across the image plane. The array of photosensing elements is connected to a storage and processing unit by an electrical cable which permits communication therebetween. The storage and processing unit performs mathematical calculations to the electrically generated signals received from the tri-linear array of photosensing elements or image data primarily to correct for non-uniformities among the photosensing elements or in general to realign received signal information. Image realignment is then performed by a host computer electrically coupled to the storage and processing unit during the retrieval of image data from the camera. The storage and processing unit may be connected to a host computer having a view screen. The view screen and host computer enable a photographer to visualize and adjust an image to be recorded.

15 Claims, 4 Drawing Sheets

DIGITAL IMAGE RECORDING DEVICE

BACKGROUND OF THE INVENTION

During use of a standard view camera, an image to be recorded is composed and focused upon a ground glass plate positioned proximate to the back of the camera. Once the image has been composed and focused, the standard view camera is designed to receive a universal film holder which includes photographic film. The universal film holder is inserted into a film cartridge slot which becomes accessible by the manual retraction of the ground glass plate against a spring force which in turn opens the film cartridge slot for receipt of the universal film holder and for placement of the photographic film into the focal plane for the camera. The spring force then holds the universal film holder in place within the camera. The dark slide of the universal film holder may then be withdrawn for exposure and recording of the image upon the photograph film.

Standard view cameras are generally limited to the recording of images on photographic film. The ground glass plate of the standard view camera functions to provide the focal plane on which the image is to be recorded. In the past, the structural modification of a standard view camera, including the removal of the ground glass plate, has been required in order to digitally record an image. The modification and incorporation of digitized image recording apparatus into a standard view camera frequently causes the camera to become unfocused. The known digital image recording apparatus are inflexible and fail to provide a photographer with the normal ability to refocus, or to recompose an image to be recorded. In addition, the known digitized image recording apparatus to be incorporated into a standard view camera were frequently attached in an incorrect focal plane. The failure to position the digital image recording apparatus within the correct focal plane frequently resulted in the recording of an unfocused image.

In the past, the digital image recording apparatus were generally formed of two types. The first type included arrays of solid state silicon photosensor pixels which converted surface light into electrical signals. The first type of digital image recording apparatus were generally used within cameras designed specifically for recording digital images. These cameras incorporated specific lenses and functioned in a manner similar to a video camera. The second type of digital recording apparatus involved devices to be attached to existing cameras so that existing camera bodies and lenses were available for use. These devices in general were quite large and cumbersome and were frequently incorporated into very large enclosures or boxes which were designed to be fastened in substitution for the back of a camera. Additionally, the second type of device incorporated scanning units which traversed the focal plane of an image. The scanning devices were frequently required to repeatedly traverse the focal plane of an image in a row by row pattern which was quite time consuming.

None of the known digital image recording apparatus incorporate an array of photosensing elements into a universal housing designed to be inserted into the cartridge film slot of a non-modified standard view camera. The digital image recording apparatus as known do not substitute a plurality of photosensor image resolution pixels in the identical focal plane for a standard view camera during the digital recording of an image.

SUMMARY OF THE INVENTION

The digital image recording device includes a tri-linear array of photosensing elements which include a plurality of photosensor pixels. The tri-linear array of photosensing elements is mounted upon a frame for linear movement within a universal housing. The housing is adapted for insertion into the cartridge film slot of a standard view camera. The movement of the array of photosensing elements across an image plane within the standard view camera sequentially senses an image to be recorded. Each row of the tri-linear array of photosensing elements includes a separate color filter stripe which enables the color recording of an image during one pass of the scanner across the image plane. The array of photosensing elements is connected to a storage and processing unit by an electrical cable which permits communication therebetween. The storage and processing unit performs mathematical calculations to the electrically generated signals received from the tri-linear array of photosensing elements primarily to correct for non-uniformities among the photosensing elements or in general to realign received signal information. Image realignment is then performed by a host computer electrically coupled to the storage and processing unit during the retrieval of image data from the camera. The storage and processing unit may be connected to a host computer having a view screen. The view screen and host computer enable a photographer to visualize and adjust an image to be recorded.

It is a principal object of the present invention to provide a new and improved digital image recording device of relatively simple and inexpensive design, construction, and operation which is safe and durable and which may be used with a standard view camera without fear of injuries to persons and/or damage to property.

A principal object of the present invention is to provide a simple and reliable array of photosensing elements for use in a standard view camera for digitally recording an image.

Another principle object of the present invention is to provide a photographer with the ability to record an image either through use of photographic film or to scan the image digitally without modification of the composition, exposure, or setup of a standard view camera.

Still another object of the present invention is to provide a photographer with the ability to digitally record an image through use of a standard view camera without removal of the back, or ground glass plate, and attachment of bulky digital recording apparatus.

Still another object of the present invention is to digitally record an image by use of a standard view camera utilizing standard lenses and view camera accessories.

Still another object of the present invention is to provide a digital image recording apparatus which may be easily and quickly inserted into, or withdrawn from, the film cartridge slot of a standard view camera.

A feature of the present invention is a charge-coupled device incorporated into a universally-sized housing for use in a standard view camera for digitally recording an image.

Another feature of the present invention is a charge-coupled device circuit board electrically connected to the charge-coupled device for receiving and generating electrical signals corresponding to an image read by the charge-coupled device.

Still another feature of the present invention is a charge-coupled device including a plurality of photosensor image resolution pixels for converting light representing the read image to electrical signals.

Still another feature of the present invention is a storage and processing unit electrically connected to the charge-coupled device circuit board for receiving the generated electrical signals representing the read image.

Still another feature of the present invention is a digital processor for performing mathematical calculations to the generated electrical signals or image data primarily to correct for non-uniformities among the photosensing elements or in general the realignment of signal information.

Still another feature of the present invention is a microcontroller in electrical communication with the charge-coupled device for controlling the recording of the read image.

Still another feature of the present invention is a plurality of bidirectional digital interface circuit boards including analog-to-digital converters for processing of the generated electrical signals representing a recorded image.

Still another feature of the present invention is a view screen electrically coupled to a host computer which is connected to the storage and processing unit for display of the read image.

BRIEF DESCRIPTION OF THE DRAWINGS

FIG. 6 is a detail view of the charge-coupled device.

DETAILED SPECIFICATION OF THE PREFERRED EMBODIMENT

Figure 1:
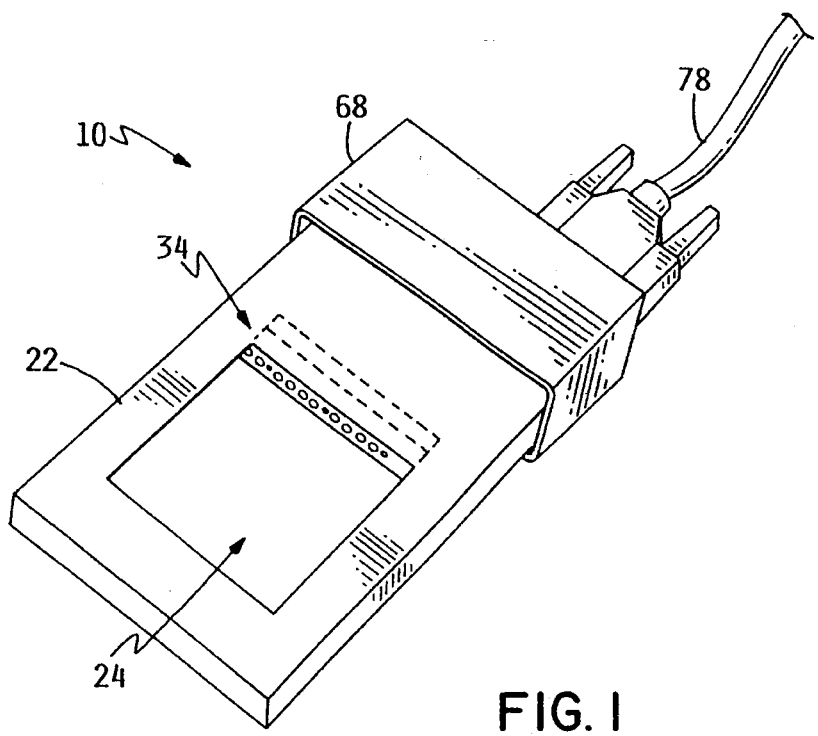
FIG. 1 is a detail view of the universal housing.
Figure 5:
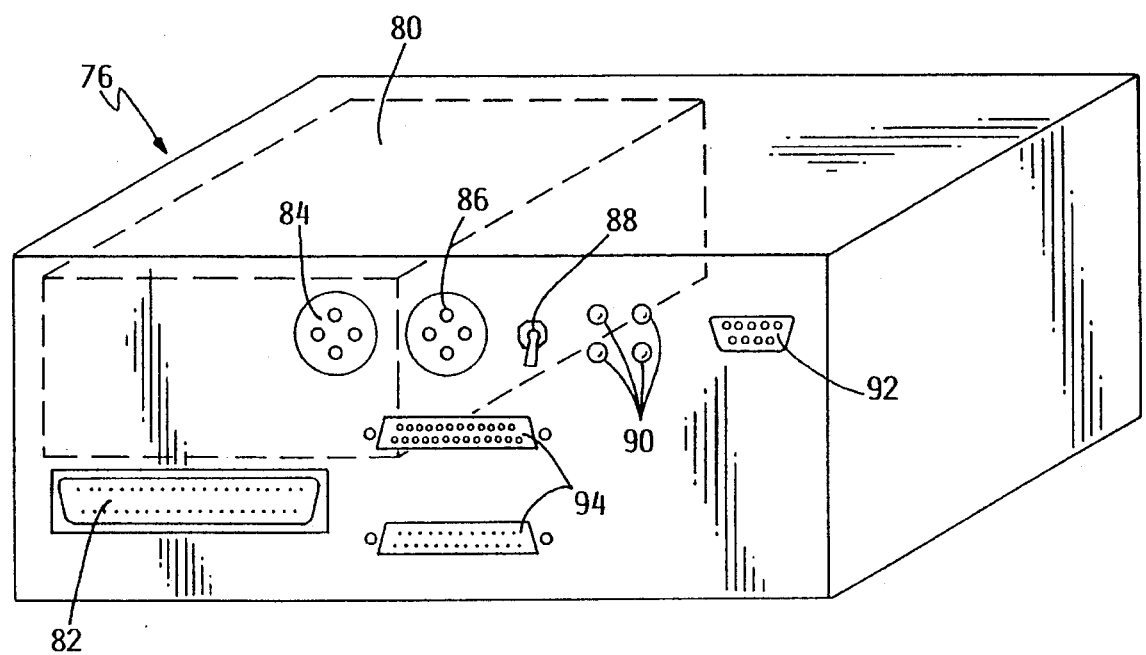
FIG. 5 is a detail view of the storage and processing unit.
Figure 2:
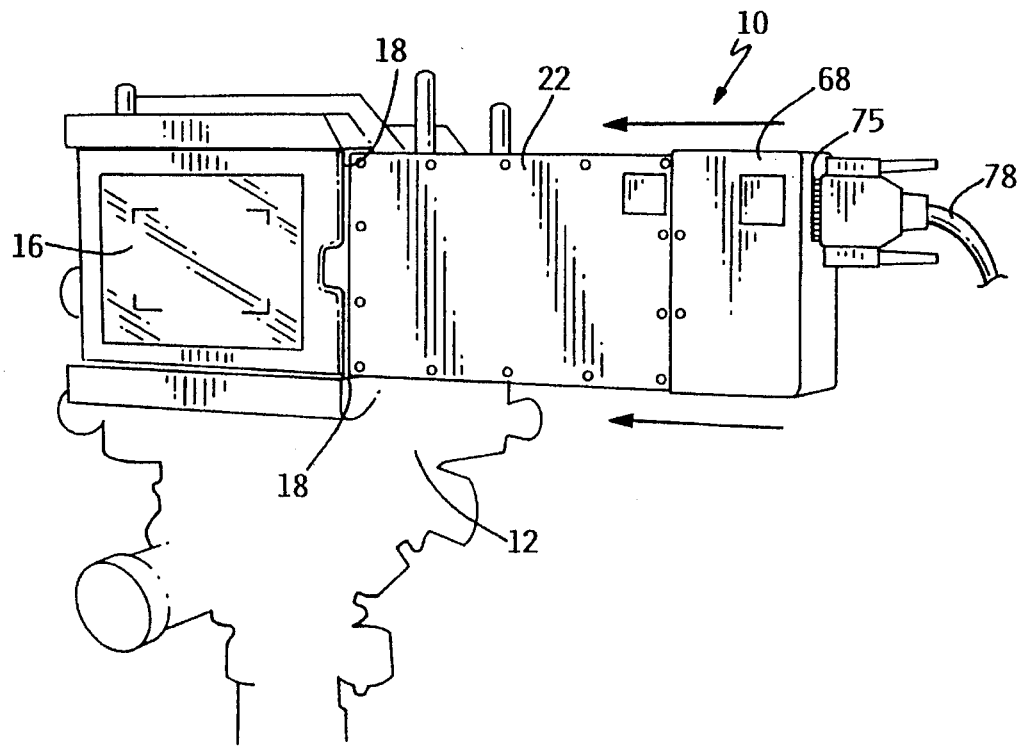
FIG. 2 is an environmental view of the universal housing to be inserted into the film cartridge slot of a standard view camera.
Figure 3:
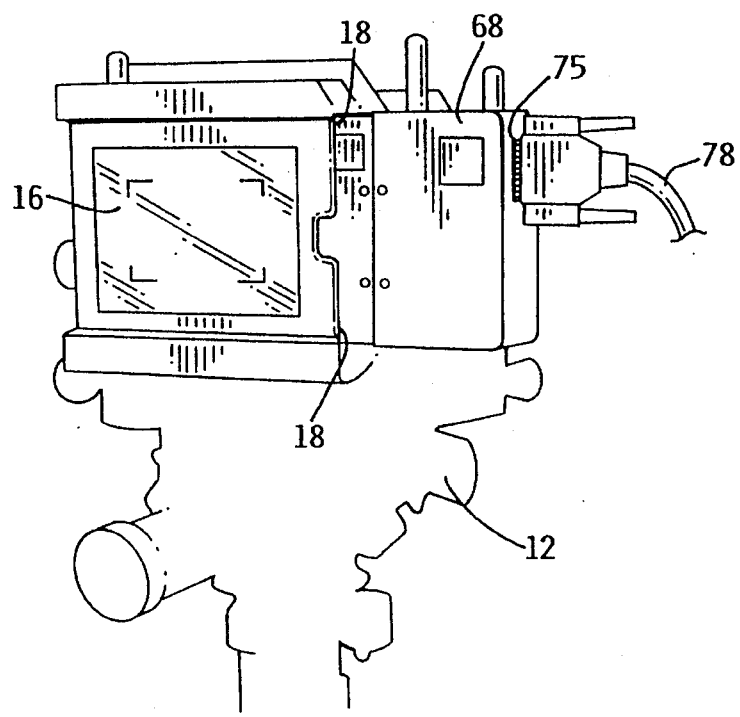
FIG. 3 is an environmental view of the universal housing inserted into the film cartridge slot of a standard view camera.

One form of the invention is illustrated and described herein. In general, the digital image recording device is indicated by the numeral 10. The digital image recording device 10 is preferably used as an insert into a standard view camera 12. In general, the standard view camera 12 includes a lens, a ground glass plate 16 positioned as the focal plane for the camera, and a film cartridge slot 18 which is adapted to receive a universally-sized film cartridge. The film cartridge is commonly referred to as having a 4×5 size for use in a standard view camera 12. View cameras 12 may also be sized for recording images on 5×7, 8×10, 11×14 or several smaller sizes of photographic film. The present invention is described for use in a 4×5 standard view camera 12. The dimensions for the digital image recording device 10 may be suitably adapted for use in any of these referenced sizes of view camera 12 at the preference of a photographer.

During use of a standard view camera 12 a photographer will focus an image upon the ground glass plate 16. The photographer will then retract the ground glass plate 16 for insertion of the film cartridge in the film cartridge slot 18, substituting the film contained in the film cartridge for the focal plane of the standard view camera 12. The shutter of the camera may then be opened for exposure of the photographic film. The digital image recording device 10 has been designed so that a photographer may duplicate these general steps when recording an image digitally in substitution for the use of photographic film.

The digital image recording device 10 includes a universal housing 22. The universal housing 22 includes a window 24 which is preferably positioned forwardly, toward the lens of the standard view camera 12. The universal housing 22 is preferably sized and adapted for sliding engagement into the film cartridge slot 18, in replacement for a film cartridge during use of the digital image recording device 10. The universal housing 22 when inserted into the film cartridge slot 18 is preferably positioned into the exact focal plane for the standard view camera 12.

The universal housing 22 includes an upper channel 26, a lower ridge 28, a bearing ledge 30, a back plate 23, and a drive aperture 32. The upper channel 26, lower ridge 28, and bearing ledge 30, in conjunction with a lead screw 54 function to position and support the charge-coupled device 34 within the universal housing 22.

The universal housing 22 preferably has a length dimension approximating 7.1 inches, a height dimension approximating 4.7 inches, and a width dimension approximating .64 inches for use in a standard 4×5 view camera 12. It should be noted that the dimensions indicated herein have been provided for illustrative purposes only and may be suitably increased or decreased by an individual for use with any standard view camera 12 so long as the universal housing 22 may be inserted into the film cartridge slot 18.

The scanning area for the window 24 preferably has a length dimension approximating ninety millimeters or 3.5 inches a height dimension approximating seventy-two millimeters or 2.8 inches. The diagonal scanning area for the window 24 preferably approximates one hundred and fifteen millimeters. It should be noted that the size of the window 24 may be suitably increased or decreased at the discretion of an individual to provide for any size of scanning area as preferred by a photographer. It should also be noted that the scanning area is determined in one dimension by the length of the charge-coupled device 34, and in the other dimension by the distance that the charge-coupled device 34 travels.

The universal housing 22 enables a photographer to digitally record an image with a standard view camera 12 without removal of the ground glass plate 16 or the back of the camera. In addition, the universal housing 22 enables a photographer to substitute a digital image recording device 10 into the exact focal plane for the camera 12, thereby eliminating problems associated with the recording of an unfocused image. Finally, the universal housing 22 enables a photographer to use a digital image recording device 10 without modification of the structure and method of use of a standard view camera 12.

A charge-coupled device 34 is preferably located within the universal housing 22 and functions to digitally record an image. In general, the charge-coupled device 34 senses light representing an image to be recorded and converts the sensed light to electrical signals.

The sensing elements for the charge-coupled device 34 may be single-crystal silicon arrays of photosensor pixels, or single-crystal linear arrays of photosensor pixels.

In general, the charge-coupled device 34 refers to a structure of electrodes and doped single-crystal silicon that has the ability to transfer packets of electrical charge from one region of the silicon to another by means of a series of virtual "wells". By manipulating the potentials of the electrodes, packets of charge are stored and transferred discretely from one "well" to the next. The charge-coupled device 34 includes a channel proximate to one end. A charge-sensing amplifier is positioned adjacent to the channel for conversion of each charged packet into an electrically measurable quantity which is usually voltage. Generally, the silicon and electrodes behave in a manner similar to a semiconductor junction, for providing the charge-coupled device 34 with light-sensitive properties. Light striking the silicon is preferably converted into electrical charge in each of the "wells" and subsequently read out sequentially by transferring the charges from one "well" at a time to the charge-sensing amplifier. More efficient light-sensing performance may be obtained from separate photodiodes formed within the silicon. The separate photodiodes also convert incident light into electrical charges which are then transferred simultaneously into the charge-coupled device "wells" prior to sequential readout as described for the doped single-crystal silicon. Arrays of photodiodes may also be read out without using a charge-coupled device 34 but by individually addressing and transferring each photo diode's charge packet to a common output line. The drawback of this approach is that the complexity of the device is significantly increased.

Area arrays of photosensing elements generally require pixels 36 to be positioned adjacent to each other in two dimensions. These area arrays of photosensing elements are usually constructed with either narrow separate photodiodes and charge-coupled device channels sharing each row width, or with full-width charge-coupled device channels which independently sense light. The area arrays of photosensing elements incorporating narrow separate photodiodes are usually used in video cameras which must be continuously exposed for image readout, while the area arrays of photosensing elements incorporating full-width charge-coupled device channels are normally found in applications for still imaging where the array must be maintained in darkness during the readout of an image. Many linear arrays of photosensing elements contain a single row of separate full-width photodiodes coupled to a large charge-coupled device channel for high performance transfer and readout.

The digital image recording device 10 incorporates an integrated circuit with three linear arrays of photodiodes and charge-coupled device channels with each linear array covered by a color filter stripe.

In the preferred embodiment, the charge-coupled device 34 is formed of three adjacent linear rows 38, where each row 38 includes a plurality of photosensor pixels 36. In this embodiment, the charge-coupled device 34 functions as a tri-linear scanner providing a one-dimensional strip of photosensor pixels 36 for traversing an image plane to sequentially record an image. Each of the three rows 38 of photosensor pixels 36 includes an independent color filter stripe selected from the colors of red, green and blue. The tri-linear scanner as incorporated into the charge-coupled device 34 is physically moved across the window 24 for scanning the image plane of the standard view camera 12. The three linear rows 38 of photosensor pixels 36 function to achieve full resolution color sensing of an image during one pass of the charge-coupled device 34 across the image plane or window 24. The three linear rows 38 of photosensor pixels 36 independently sense image data which are sequentially out of alignment, or include a phase shift, with respect to each other. The realignment of the image data sensed by the three linear rows 38 of photosensor pixels 36 occurs within a host computer. Prior to the realignment of the image data by the host computer, the storage and processing unit 40 performs mathematical calculations upon the image data primarily to correct non-uniformities among the photo sensing elements, or in general, a realignment of signal information, or resolution reduction, when requested, by the mathematical combination of adjacent photosensor pixels 36.

Figure 4:
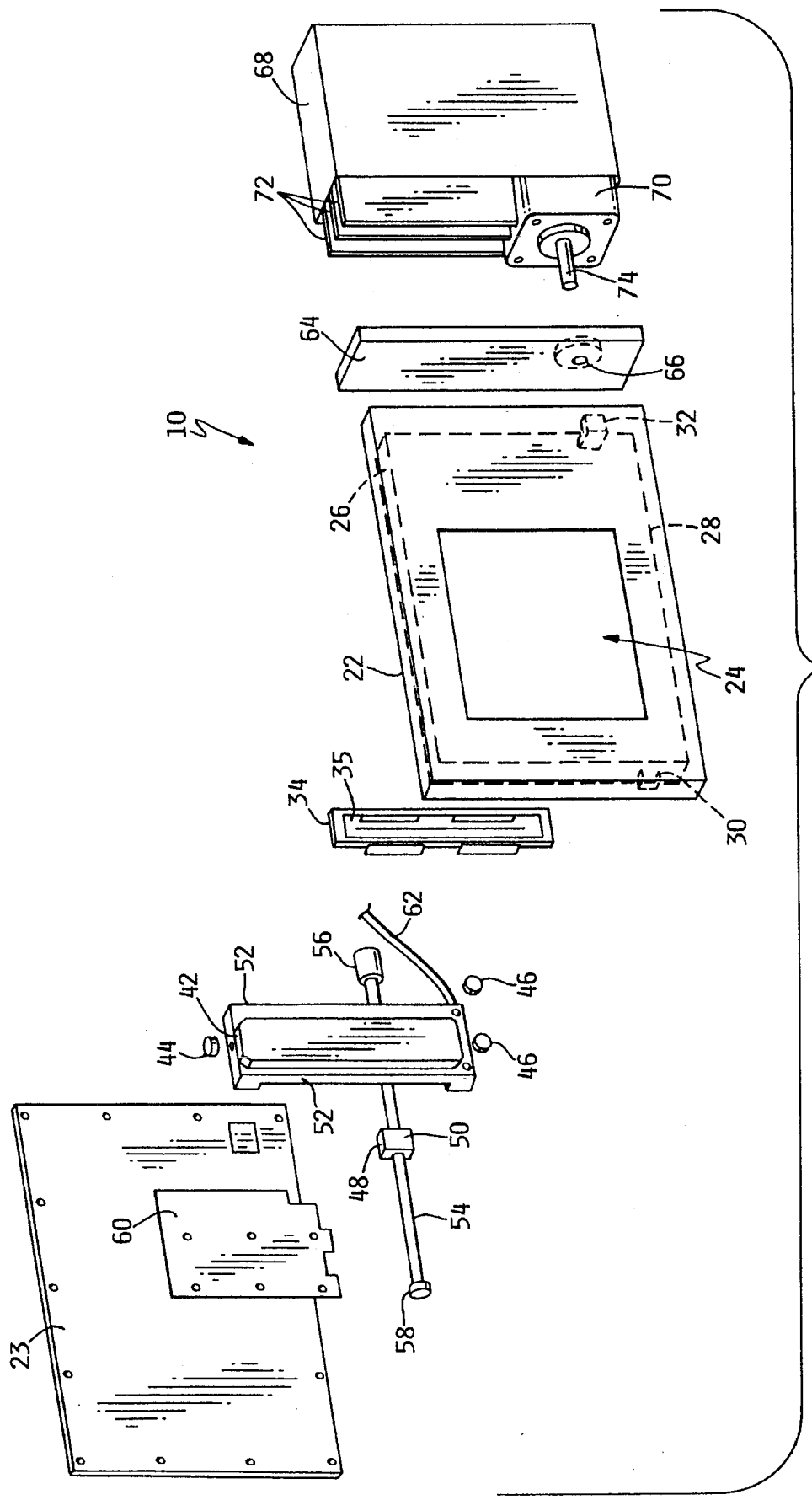
FIG. 4 is an exploded view of the universal housing.
Figures 6A, 6B:
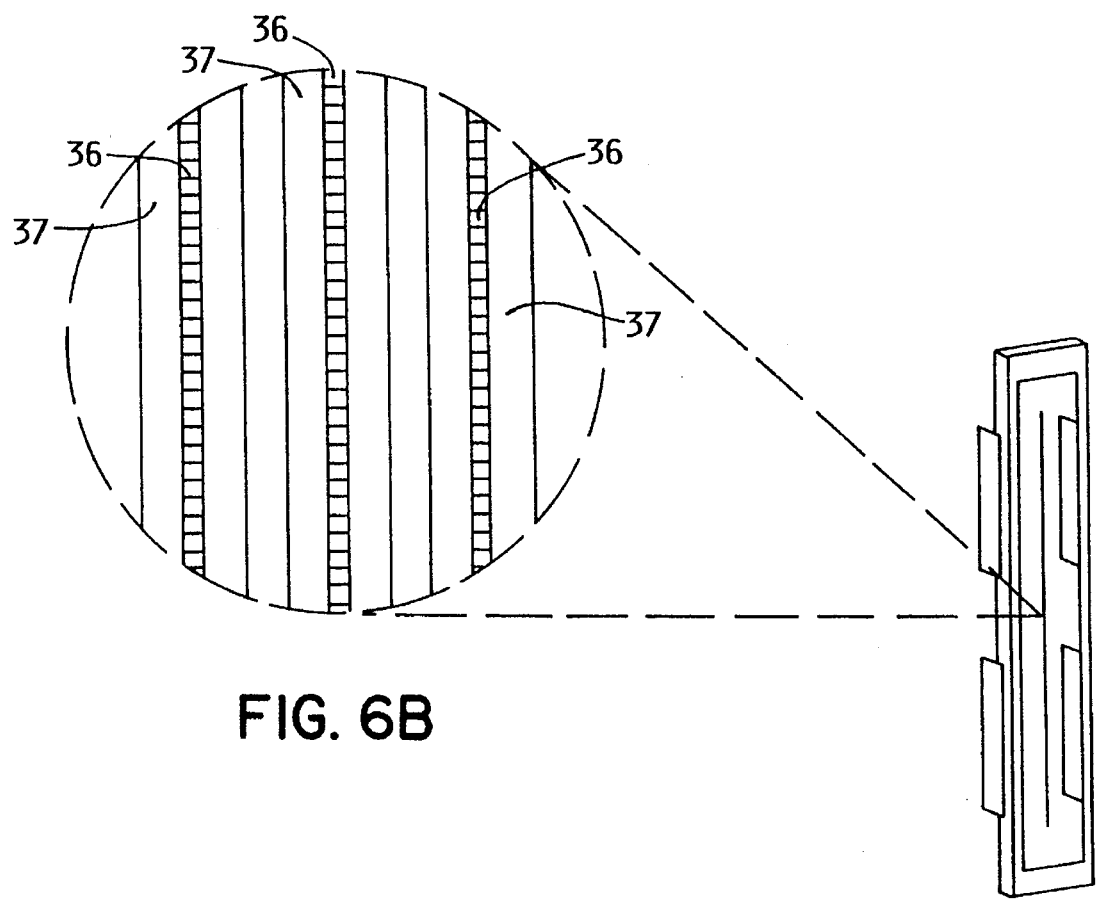
FIG. 6b is a detail enlarged view of the photosensor pixels.

The charge-coupled device 34 is a long, narrow integrated circuit covered by a clear glass plate 35. Three separate color filter stripes 37 are positioned in close proximity to the integrated circuit of the charge-coupled device 34, as represented by the single vertical line down the middle of the charge-coupled device 34 of FIG. 4. The charge-coupled device circuit board 60 is preferably positioned behind the charge-coupled device 34 and is fastened to the charge-coupled device frame 42. The charge-coupled device 34 is mounted and connected to the charge-coupled device circuit board 60. When assembled, the charge-coupled device frame 42 surrounds the charge-coupled device 34, with the lead screw 54 and threaded drive 50 immediately behind the charge-coupled device 34.

In an alternatively embodiment, the charge-coupled device 34 may be formed of a single-crystal silicon array of photosensor pixels 36 which may be positioned adjacent to the window 24. In this embodiment, the charge-coupled device 34 is not moved linearly within the universal housing 22 and is permanently positioned in covering relationship over the window 24.

The charge-coupled device 34 preferably provides an image sensing area equivalent to a photosensor array having pixel dimensions approximately equal to 6,000 by 7,520 pixels for reproduction of an image having a resolution of superior quality to photographic film. The use of an optimized tri-linear array of photosensor pixels 36 achieves a superior resolution (6,000×7,520 pixels) in conjunction with the precision mathematical corrections performed in the storage and processing unit 76, also effectively eliminating a number of electronic image artifacts, such as noise, streaking, excess contrast, and pixellization. Pixellization refers to the appearance of the individual pixels, often as jagged edges on otherwise smooth diagonal lines and/or as banding in otherwise smooth gradations of color, which are usually caused by insufficient spatial and/or dynamic resolution, respectively. The resolution for the charge-coupled device 34 may be adjusted at the preference of a photographer for selection of a sensing area having 83 pixels per millimeter or 2,116 pixels per inch.

The sensitivity for detection of low levels of light may also be manipulated by the adjustment of the line scanning time which is equivalent to the adjustment of the shutter speed for a standard view camera 12. The use of a longer line scanning time permits detection of lower levels of light. The range of line scanning times for use in the digital image recording device 10 may be between 1/40 of a second to 1/4 second per line as preferred by an individual. It is possible to use any resolution selection with any line scanning time selection as preferred by a photographer. A full-resolution scan may be completed in approximately 188 seconds at a setting of 1/40 second per line and a resolution of 7,520 pixels per line. It should be noted that lower-resolution scanning may occur over a shorter duration of time. The per line scanning time and number of lines may be suitably reduced to record an image within approximately sixty seconds at the preference of a photographer. The charge-coupled device 34 is readily available from either Eastman Kodak Company of Rochester, New York; Toshiba International of Tokyo Japan; Sony Corporation of Tokyo, Japan; or Thomson-CSF Corporation in France. Other forms of arrays (linear and area) are also available from Loral Fairchild Imaging Sensors, Milpitas, California; EG&G Reticon of Sunnyvale, California; and Dalsa, Inc. of Ontario, Canada.

The charge-coupled device 34 is preferably attached to a frame 42 which is transported within the universal housing 22 by a drive mechanism. The frame 42 preferably includes a first horizontal bearing 44 which is preferably positioned proximate, and is engaged to, the upper channel 26. The frame 42 additionally includes a pair of second vertical bearings 46 which are preferably proximate, and are engaged to, the lower ridge 28. An engagement block 48 having a threaded drive 50 is held captive by the frame 42 proximate to the pair of second vertical bearings 46. The engagement block 48 and threaded drive 50 are preferably centrally positioned approximately equal distances between the two vertical edges 52 of the frame 42. A lead screw 54 is preferably engaged through the threaded drive 50 which functions to provide for the smooth linear transition of motion for the charge-coupled device 34 across the focal plane and/or window 24 of the universal housing 22. The first horizontal bearing 44 and the pair of second vertical bearings 46 preferably function to provide for low friction linear transition of the charge-coupled device 34 within the universal housing 22.

The lead screw 54 includes a motor coupler 56 positioned proximate to one end, and a lead screw bearing 58 positioned proximate to the opposite end. The lead screw bearing 58 is preferably positioned within the bearing ledge 30. The motor coupler 56 is preferably positioned adjacent to the drive aperture 32.

The first horizontal bearing 44, pair of second vertical bearings 46, engagement block 48, threaded drive 50, and lead screw 54, in combination, preferably function to centrally position, and provide suspension to, the charge-coupled device 34 within the universal housing 22, preventing backlash of motion during use of the digital image recording device 10. The combination of the lead screw 54, threaded drive 50, engagement block 48, pairs of second vertical bearings 46, and first horizontal bearing 44 preferably in combination function to eliminate jumps and provide for the smooth linear transition of motion for the charge-coupled device 34 across the focal or image plane for the standard view camera 12.

A charge-coupled device circuit board 60 is preferably electrically connected to the charge-coupled device 34 and is affixed to the frame 42. The charge-coupled device circuit board 60 preferably includes a flexible cable 62 which passes through the universal housing 22 and motor plate 64. The charge-coupled device circuit board 60 preferably receives electrical signals generated by the charge-coupled device 34 which correspond to a read image. The charge-coupled device circuit board 60 then transmits analog electrical signals representing the read image through the flexible cable 62. The flexible cable 62 is preferably of sufficient length to permit communication of the electrical signals regardless of the position of the frame 42 within the universal housing 22.

A motor plate 64 is preferably attached to the universal housing 22 proximate to the drive aperture 32. The motor plate 64 preferably includes an aperture 66 which is adapted to receive the motor shaft 74.

An insert handle 68 is preferably engaged to the motor plate 64. The insert handle 68 preferably encloses a motor 70 and a plurality of bidirectional digital interface circuit boards 72.

The motor 70 is preferably positioned proximate to the aperture 66 and includes a motor shaft 74 for penetration therethrough. The motor 70 preferably functions to provide the drive mechanism for the linear motion of the charge-coupled device 34 within the universal housing 22.

The bidirectional digital interface circuit boards 72 are preferably electrically connected to the flexible cable 62.

The bidirectional digital interface circuit boards 72 preferably function to convert the analog electrical signals received from the charge-coupled device circuit board 60 into digital electrical signals for communication to the storage and processing unit 76. The bidirectional digital interface circuit boards 72 are also electrically connected to a pair of connectors 75 which are positioned opposite to the motor 70. The pair of connectors 75 is preferably coupled to the electrical connection cable 78 for transmission of the electrical signals from the bidirectional digital interface circuit boards 72 to the storage and processing unit 76. The electrical connection cable 8 additionally functions to supply power to the motor 70 for operation of the digital image recording device 10. The bidirectional digital interface circuit boards 72 preferably contain the analog-m-digital converters for processing of the electrical signals received from the charge-coupled device 34.

The engagement of the motor 70 as controlled by the storage and processing unit 76 rotates the lead screw 54 in either a clockwise or counterclockwise direction for pushing or drawing the frame 42 for linear transition of the charge-coupled device 34 within the universal housing 22. The engagement between the frame 42 as attached to lead screw 54 preloads and creates a three-point suspension between the first and second bearings 44, 46 eliminating backlash of motion for the charge-coupled device 34.

The storage and processing unit 76 includes a high capacity hard drive 80 which may have a storage capacity in excess of one gigabyte. The internal hard drive 80 preferably includes sufficient storage capacity to permit field and location photography without the necessity for additional storage units.

The storage and processing unit 76 additionally includes a digital signal processor (not shown) which in general performs mathematical calculations on the generated electrical signals representing a read image primarily to correct non-uniformities among the photosensing elements. The electrical signals representing an image are then realigned by a host computer for ultimate storage. The digital signal processor additionally functions to provide for real-time corrections to an image to be recorded. The digital image processor generates an image file having a capacity of up to 130 megabytes for image resolution which may be accessed by a host computer having the requisite memory. Access to a recorded image may be provided through the use of a commercially available desktop graphics software package, an example of which is the Photoshop™ as available through Adobe Systems. During initial image access, the host computer adjusts any time lag or misregistration between the three linear rows 38 of photosensor pixels 36 during the recording of an image. The true color representation of the image is then available to a photographer through access by the host computer. It should be noted that the image data must be retrieved from the camera, via the camera application software, and stored upon the host computer hard disk prior to being accessed by the available desktop graphics software. Image registration occurs during the retrieval phase of this operation, so that the files stored upon the host computer are correct and provide a true color representation of an image to be recorded.

The storage and processing unit 76 may also include a microcontroller (not shown) in communication with the charge-coupled device 34 for control of the digital camera scanning and storage functions. In general, the microcontroller operates the actual exposure for the charge-coupled device 34 by regulating the time of the electrical signals which cause image data to be sensed. Additionally, the microcontroller controls the motor drive signals to operate the motor 70 at the requisite speed and direction. Further, the microcontroller communicates with the digital signal processor and disk drive 80 to maintain the flow of image data during an exposure, and with the host computer, to exchange control and status information. In general, the camera application software includes the exposure tools such as the on-screen histogram and the "spot meters" for optimization of the desired contrast and total range for the image to be recorded.

The storage and processing unit 76 may additionally include an interface for either external or internal storage of an image to be recorded at the preference of a photographer.

The digital image recording device 10 may include three general types of operational software. The first type includes the housekeeping/access software which provides for the storage and retrieval of data, as represented by the generated electrical signals corresponding to a read image, which are written upon the hard drive 80. The housekeeping/access software may be maintained within the storage and processing unit 76. The second type of software is identified as the application software which in general performs the realignment functions for the provision of a resolved digitally recorded image. The application software additionally includes the exposure tools including the histogram and the "spot meter". The application software is adapted to be permanently stored upon a host computer which is interfaced to the storage and processing unit 76. An example of a suitable host computer would be an Apple Macintosh Powerbook or an Apple Macintosh personal computer. The third type of software is identified as the over- the-counter desktop graphics software, an example of which would be the Photoshop™ as provided by Adobe Systems, Inc. The desktop graphics software may also be permanently stored within a host computer.

The storage and processing unit 76 includes a small computer systems interface port 82 (SCSI) which is preferably used for receiving engagement of a cable extending from the host computer. In addition, the storage and processing unit 76 may include an external power port 84, a battery port 86, and a off/on switch 88. The storage and processing unit 76 may also include a plurality of indicator lights 90 which function to indicate power being provided to the digital recording device 10, the existence of external power to the unit, the charging of the battery, or the activity of the hard disk 80. The storage and processing unit 76 may additionally include a serial port 92 which is preferably connected to the serial port of the host computer. Finally, the storage and processing unit 76 may include a pair of connectors 94 for engagement to the electrical connection cable 78 as affixed to the insert handle 68.

It should be noted that the host computer will preferably incorporate a view screw for the visualization of an image to be recorded.

Any preferred power source may be used to operate the digital image recording device 10 at the preference of an individual. The storage and processing unit 76 is preferably adapted for receipt of either standard AC power as may be available in a studio, or battery power provided by a 12-volt battery for on-location or field photography. The digital image recording device 10 includes a 12-volt battery pack for use by a photographer.

Most silicon-based photosensitive materials are highly responsive to radiation in the near-infrared region, which occurs outside of human vision. Color filter technology often permits accurate discrimination or color filtration over only a narrow band of wave lengths, allowing wave lengths further removed from the area of interest to pass unfiltered. These situations necessitate the use of a separate infrared-blocking filter to remove any near-infrared radiation accompanying the visible spectrum when a siliconbased light sensor is used, even if color separation filters have been placed on the sensor itself. The digital image recording device 10 incorporates an additional filter which is separate from the charge-coupled device 34, being instead installed on either side of the camera lens with one of a variety of standard photographic filter holders. When recording image with conventional film, this additional filter must be removed from the optical path. Although an infrared filter is not normally needed with conventional film photography, the installation and removal of filters is in general quite common, whether for color correction or dramatic effect. The infrared filter used with the digital image recording device 10 is of a standard shape for use in standard photographic filter holders. Insertion or removal of any filter from the optical path may change the focal distances involved, requiring slight re-adjustment of the camera focus. On advantage of a separate infrared filter is that different filters may be used with each of a variety of light sources, allowing optimization of the camera for each type of light source selected. An added advantage of the separate infrared filter is that the digital image recording device 10 may be used without the infrared filter for very sensitive near-infrared imaging.

In response to a photographer's demands, specifically with respect to the activation of the digital image recording device 10 and opening of a camera shutter, the microcontroller generates motor-drive signals for movement of the frame 42 linearly across an image plane. The microcontroller simultaneously generates control signals for the charge-coupled device 34 to regulate exposure for the image to be recorded. The microcontroller then regulates the flow of information as represented by the generated electrical signals from the charge-coupled device 34 to the digital signal processor for storage upon the high capacity hard drive 80. Data representing an image to be recorded may then be retrieved from the high capacity hard drive 80 for access by an external host computer during review or manipulation of the image output.

The digital image recording device 10 enables a photographer to substitute a digital recording device for a standard film cartridge without modification of image composition or focus of a standard view camera 12. A photographer is also provided with a full range of motion or movement for a view camera 12 during the recording of images. The digital image recording device 10 additionally permits a photographer to perform a full color picture scan of an image within 30 seconds in order to verify composition, exposure, and/or color balance, which in turn minimizes instant film expense and waste.

The digital image recording device 10 permits a photographer to match an image scan to a desired output size for maximization of the visual effect and quality of a recorded image. A photographer is also able to select a desired exposure in one-third fstop increments through the time selection which has no effect on the selected resolution. The digital image recording device 10 additionally enables a photographer to perform standard spot or incident metering of an image to be recorded and to conduct experimentation with respect to color balances, exposures and contrasts without consuming numerous sheets of film or a plurality of Polaroid photographs. The digital image recording device 10 may be used in daylight, tungsten, or HMI lighted environments providing sensitivity nominally equivalent to an ASA 100 film.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. A combination digital image recording device and view camera having a film cartridge slot, said device comprising:
   (a) a universal housing having a window, an array of photosensing elements positioned within said housing, and a first circuit boardelectrically connected to said array of photosensing elements, said housing for inserting into said film cartridge slot, said array of photosensing elements for reading an image to be recorded, and said first circuit board for receiving and generating electrical signals corresponding to said read image and a converting means for converting said electrical signals from said array of photosensing elements to digital signals;
   (b) a cable connected to, and in electrical communication with, said converting means for communication of said digital signals;
   (c) a storage and processing unit connected to said cable for receiving said digital signals and for processing and storage of said digital signals corresponding to said read image; and
   (d) an insert handle, said converting means positioned in said insert handle said insert handle comprising at least one bidirectional digital interface circuit board electrically connected to said first circuit board.

2. The digital image recording device according to claim 1, said array of photosensing elements comprising a scanner including a plurality of photosensor image resolution pixels.

3. The digital image recording device according to claim 2, said scanner comprising a charge-coupled device frame having a charge-coupled device having three rows, each of said rows comprising a plurality of photosensor image resolution pixels, each row further comprising an individual color filter stripe.

4. The digital image recording device according to claim 3 further comprising a lead screw connected to a motor positioned within said housing and being further connected to said charge-coupled device frame for linear movement of said scanner across said window for reading of said image.

5. The digital image recording device according to claim 4, further comprising a bearing connected to said lead screw opposite to said motor, said bearing fixedly positioned with respect to said housing.

6. The digital image recording device according to claim 1, further comprising a power source comprising a battery.

7. The digital image recording device according to claim 5, said housing further comprising a channel and a ridge, a plurality of wheels connected to said charge-coupled device frame, at least one of said wheels engaged to said channel and at least one of said wheels engaged to said ridge for provision of low friction linear movement of said charge-coupled device frame within said housing.

8. The digital image recording device according to claim 5, wherein said charge-coupled device frame and said lead screw provide for suspension of said charge-coupled device between said charge-coupled device frame and said housing.

9. The digital image recording device according to claim 8, further comprising a connector cable attached to said first circuit board and to said bidirectional digital interface circuit board.

10. The digital image recording device according to claim 1, said storage and processing unit further comprising a digital processor for performing mathematical calculations upon said generated digital signals representing said image, and a disk drive for storage of said mathematically corrected digital signals.

11. The digital image recording device according to claim 1, further comprising a host computer connected to said storage and processing unit.

12. The digital image recording device according to claim 11, further comprising a view screen electrically coupled to said host computer for display of said read image.

13. The digital image recording device according to claim 1, wherein said array of photosensing elements is positioned adjacent said window.

14. The digital image recording device according to claim 1, wherein said housing has a length dimension of at least 5 inches, a height dimension of at least 4 inches, and a width dimension approximating 0.64 inch.

15. The digital image recording device according to claim 1, wherein said cable is electrically connected to said bidirectional digital interface circuit board.

* * * * *

UNITED STATES PATENT AND TRADEMARK OFFICE
CERTIFICATE OF CORRECTION

PATENT NO. : 5,570,146

DATED : October 29, 1996

INVENTOR(S) : Michael L. Collette

It is certified that error appears in the above-identified patent and that said Letters Patent is hereby corrected as shown below:

Column 3, line 34, after the numeral 6, insert the letter --a--.

Column 3, line 34, between the words "device" and "and", delete the ".".

Column 8, line 12, delete "8" and insert --78--.

Column 8, line 15, delete "analog-m-digital" and insert --analog-to-digital--.

Column 10, line 5, delete "siliconbased" and insert --silicon-based--.

Column 10, line 59, delete "fstop" and insert --f-stop--.

Column 11, line 15, delete "boardelectrically" and insert --board electrically--.

Signed and Sealed this

Eleventh Day of February, 1997

Attest:

BRUCE LEHMAN

Attesting Officer

Commissioner of Patents and Trademarks